US010927731B2

(12) United States Patent
Iwahashi

(10) Patent No.: US 10,927,731 B2
(45) Date of Patent: Feb. 23, 2021

(54) CYLINDER HEAD COVER AND METHOD OF MANUFACTURING THE CYLINDER HEAD COVER

(71) Applicant: KABUSHIKI KAISHA TOYOTA JIDOSHOKKI, Kariya (JP)

(72) Inventor: Takuo Iwahashi, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/565,795

(22) Filed: Sep. 10, 2019

(65) Prior Publication Data

US 2020/0095911 A1    Mar. 26, 2020

(30) Foreign Application Priority Data

Sep. 21, 2018  (JP) ................. 2018-176978

(51) Int. Cl.
  *F01M 13/02*    (2006.01)
  *F02M 25/06*    (2016.01)
  *F01M 13/04*    (2006.01)

(52) U.S. Cl.
  CPC ...... *F01M 13/0416* (2013.01); *F01M 13/022* (2013.01); *F02M 25/06* (2013.01)

(58) Field of Classification Search
  CPC ............... F01M 13/0416; F01M 13/04; F01M 2013/0461; F01M 13/0405; F02F 1/24; F02M 35/10347; F02B 77/00
  See application file for complete search history.

(56) References Cited

U.S. PATENT DOCUMENTS

| 6,098,603 A * | 8/2000 | Maegawa | F01M 13/023 |
| | | | 123/198 D |
| 2010/0147273 A1* | 6/2010 | Akiyama | F02F 7/006 |
| | | | 123/572 |
| 2015/0052862 A1* | 2/2015 | Wakabayashi | B01D 50/002 |
| | | | 55/462 |
| 2016/0076479 A1* | 3/2016 | Ruppel | F02F 7/006 |
| | | | 123/193.3 |
| 2016/0333755 A1* | 11/2016 | Kira | F01M 13/04 |
| 2017/0356316 A1* | 12/2017 | Suzuki | F01M 13/0416 |
| 2019/0017466 A1* | 1/2019 | Kashiwabara | F16H 57/035 |
| 2019/0234261 A1* | 8/2019 | Ishikawa | F02M 35/1038 |

FOREIGN PATENT DOCUMENTS

| JP | 03-172524 A | 7/1991 |
| JP | 2015-121195 A | 7/2015 |

* cited by examiner

*Primary Examiner* — Long T Tran

(74) *Attorney, Agent, or Firm* — Sughrue Mion, PLLC

(57) ABSTRACT

A cylinder head cover includes a main body and a side projection portion. The main body is provided so as to cover a cylinder head, and collects a blowby gas. The side projection portion discharges the blowby gas toward an intake passage. The cylinder head cover includes a cover gas passage through which the blowby gas flows from a main body gas passage to an outlet of the side projection portion. A minimum passage cross-sectional area portion of the cover gas passage is provided not in the side projection portion but in the main body gas passage. The main body has a hole or a projection branch passage at a position of the main body gas passage that is downstream of the minimum passage cross-sectional area portion. The main body, the side projection portion, and the hole or the projection branch passage are integrally molded.

7 Claims, 7 Drawing Sheets

US 10,927,731 B2

CYLINDER HEAD COVER AND METHOD OF MANUFACTURING THE CYLINDER HEAD COVER

CROSS-REFERENCE TO RELATED APPLICATION

This application claims priority to Japanese Patent Application No. 2018-176978 filed on Sep. 21, 2018, the entire disclosure of which is incorporated herein by reference.

BACKGROUND ART

The present disclosure relates to a cylinder head cover of an internal combustion engine and a method of manufacturing the cylinder head cover.

A blowby gas is generated inside an internal combustion engine, and a blowby gas recirculation system that flows the blowby gas into an intake passage is configured. Since the blowby gas is a gas containing fuel, it should not be released to an atmosphere from an environmental point of view. Thus, the blowby gas is once collected in a cylinder head cover of the internal combustion engine, and flows from the cylinder head cover to the intake passage via a pipe to burn in the internal combustion engine. Because a negative pressure is generated in the intake passage when the internal combustion engine is operated, the blowby gas is sucked from the cylinder head cover into the intake passage by the negative pressure.

An example of a conventional cylinder head cover 170 is shown in FIG. 9. When an X-axis, a Y-axis, and a Z-axis are shown in the drawing, the X-axis, the Y-axis, and the Z-axis are orthogonal to each other. A Z-axis direction indicates a vertically upper direction, and each of an X-axis direction and a Y-axis direction indicates a horizontal direction. The Y-axis direction indicates a longitudinal direction of the cylinder head cover. The cylinder head cover 170 is a molded component of resin or the like, and includes a main body 171, a side projection portion 172, a labyrinth passage portion 173, a connection passage portion 174, a projection branch passage 180A, and the like. The main body 171 is provided so as to cover a cylinder head of the internal combustion engine, collects the blowby gas generated in the internal combustion engine, and leads the collected blowby gas to the side projection portion 172 via the labyrinth passage portion 173 and the connection passage portion 174. The labyrinth passage portion 173 is a passage that has a predetermined passage cross-sectional area, that is formed into a labyrinth shape, through which the blowby gas flows, and that separates an oil component and the like in the blowby gas. The connection passage portion 174 has a predetermined passage cross-sectional area to connect an outlet portion of the labyrinth passage portion 173 and an inlet portion of the side projection portion 172. The side projection portion 172 has a cylindrical shape and protrudes from a side of the main body 171 and a pipe 182 for leading the blowby gas from the cylinder head cover 170 to the intake passage is connected. The side projection portion 172 is made by a forced extraction manufacturing method.

In a case where a split, a crack, a falling off, and the like occurs in the pipe 182 connected to the side projection portion 172 of the cylinder head cover 170 and the intake passage, since the blowby gas leaks to the atmosphere, the split, the crack, the falling off, and the like of the pipe 182 need to be detected. A pressure on an upstream side of the pipe 182 is used to detect the split, the crack, the falling off, and the like of the pipe 182. Specifically, the side projection portion 172 corresponding to an outlet of the blowby gas from the cylinder head cover 170 is provided with the projection branch passage 180A that is to be connected to a detection pipe of a pressure detector, and the split, the crack, the falling off, and the like of the pipe 182 are detected by detecting a pressure in the side projection portion 172 via the projection branch passage 180A.

In Japanese Patent Application Publication No. H03-172524, a cylinder head cover having a positive crankcase ventilation (PCV) room corresponding to the above-described labyrinth passage portion is disclosed. In the cylinder head cover disclosed in Japanese Patent Application Publication No. H03-172524, the pipe for leading the blowby gas discharged from the cylinder head cover to the intake passage is connected to an outlet portion of the PCV room, and a pressure sensor for detecting a pressure in the PCV room is connected to the PCV room.

In Japanese Patent Application Publication No. 2015-121195, a blowby gas recirculation device in which an oil separator corresponding to the above-described labyrinth passage portion is separated from a cylinder head cover is disclosed. In the cylinder head cover disclosed in Japanese Patent Application Publication No. 2015-121195, the separated oil separator is fixed to an outside of the cylinder head cover, the cylinder head cover and the oil separator are connected by an upstream pipe, and the oil separator and the intake passage are connected by a downstream pipe. A branch pipe for connecting to a pressure detector is provided in a separator outlet pipe that is a connection portion to the downstream pipe in the oil separator.

When manufacturing the conventional cylinder head cover shown in FIG. 9, typically, as shown in FIG. 10 and FIG. 11, the main body 171 is formed by a lower mold JL (metal mold or the like) and an upper mold JU (metal mold or the like), and the side projection portion 172 is formed by a side mold JS (metal mold or the like). In this case, a side mold draft direction DX, which is a draft direction of the side mold JS, is a projection direction of the cylindrical side projection portion 172, and in the case of FIG. 10 and FIG. 11, the side mold draft direction DX is substantially parallel to the X-axis direction. A main body mold draft direction DZ, which is a draft direction of each of the lower mold JL and the upper mold JU, is a vertical direction, and in the case of FIG. 10 and FIG. 11, the main body mold draft direction DZ is substantially parallel to the Z-axis direction. The cylinder head cover 170 integrally molded by the lower mold JL, the upper mold JU, and the side mold JS is not provided with the projection branch passage 180A and the labyrinth passage portion 173 shown in FIG. 9. Since the labyrinth passage portion 173 has a complicated shape like a labyrinth, the labyrinth passage portion 173 is assembled separately from the cylinder head cover 170 and attached to the integrally molded cylinder head cover 170 (FIG. 12). Further, since a projection direction of the projection branch passage 180A is not parallel to the side mold draft direction DX shown in FIG. 10 and FIG. 11, the side projection portion 172 and the projection branch passage 180A are not integrally molded by the side mold JS. Thus, the side projection portion 172 and the projection branch passage 180A are separated. For this reason, the side projection portion 172 that does not have the projection branch passage 180A is formed by the side mold JS, and after the main body 171 and the side projection portion 172 are formed as an integrally molded component, the projection branch passage 180A is welded or screwed to the side projection portion 172 (FIG. 12).

In order to accurately detect a pressure in the pipe 182 for the purpose of detecting the split, the crack, the falling off, and the like of the pipe 182 (refer to FIG. 9), it has been considered that the pressure in the side projection portion 172 needs to be detected. Thus, it has been considered that the projection branch passage 180A needs to be provided on the side projection portion 172. Unfortunately, as described above, when the side projection portion 172 is formed using the side mold JS (refer to FIG. 10 and FIG. 11), the side projection portion 172 and the projection branch passage 180A are not integrally molded. Thus, the projection branch passage 180A needs to be separately welded, screwed, or the like, so that the number of parts and manufacturing process are increased. The projection branch passage 180A has a simple shape, and it is desirable to reduce the number of the parts and the manufacturing process by integrally molding the projection branch passage 180A with the side projection portion 172 or the main body 171.

In addition, a pressure sensor for detecting the pressure in the PCV room is provided on the cylinder head cover disclosed in Japanese Patent Application Publication No, H03-172524. However, there is no disclosure regarding the pressure detector for detecting the split, the crack, the falling off, and the like of the pipe connecting the cylinder head cover and the intake passage. As a result, the pressure detector for detecting the split, the crack, the falling off, and the like of the pipe is not provided.

Further, in the cylinder head cover disclosed in Japanese Patent Application Publication No. 2015-121195, although the split, the crack, the falling off, and the like of the downstream pipe are detected by the pressure detector connected to the separator outlet pipe in the oil separator, the split, the crack, the falling off, and the like of the upstream pipe are not detected. Furthermore, since the oil separator is separately provided, the pipe connecting the cylinder head cover and the intake passage is divided into the upstream pipe and the downstream pipe so that the number of parts is increased.

The present disclosure has been made in view of such a point, and in a cylinder head cover in a blowby gas recirculation system, it is directed to provide the cylinder head cover and a method of manufacturing the cylinder head cover that appropriately detect a split, a crack, a falling off, and the like of a blowby gas recirculation pipe connecting the cylinder head cover and an intake passage and that further reduce the number of parts and manufacturing process.

SUMMARY

In accordance with an aspect of the present disclosure, there is provided a cylinder head cover in a blowby gas recirculation system that flows a blowby gas generated in an internal combustion engine from the internal combustion engine into an intake passage. The cylinder head cover includes a main body and a side projection portion. The main body is a resin or metal molded component, is provided so as to cover a cylinder head of the internal combustion engine, and collects the blowby gas. The side projection portion is provided so as to project from a side of the main body and that discharges the blowby gas toward the intake passage. The side projection portion and the intake passage are connected with a pipe. The main body includes a main body gas passage that leads the collected blowby gas to the side projection portion. The main body gas passage has a predetermined passage cross-sectional area. The cylinder head cover includes a cover gas passage through which the blowby gas flows from the main body gas passage to an outlet of the side projection portion. The cover gas passage has a minimum passage cross-sectional area portion in which a passage cross-sectional area of the cover gas passage is the smallest. The minimum passage cross-sectional area portion is provided not in the side projection portion but in the main body gas passage. The main body has a hole for attaching a pressure detector that detects a pressure in the main body gas passage from an outside of the main body or a projection branch passage for connecting the pressure detector from the outside of the main body at a position downstream of the minimum passage cross-sectional area portion. The main body, the side projection portion, and the hole or the projection branch passage are integrally molded.

In accordance with another aspect of the present disclosure, there is provided a method of manufacturing a cylinder head cover in a blowby gas recirculation system that flows a blowby gas generated in an internal combustion engine from the internal combustion engine into an intake passage. The method includes providing a main body that is a resin or metal molded component, that covers a cylinder head of the internal combustion engine, and that collects the blowby gas; providing a side projection portion that projects from a side of the main body and that discharges the blowby gas toward the intake passage; setting a main body gas passage that leads the collected blowby gas to the side projection portion in the main body, the main body gas passage having a predetermined passage cross-sectional area; providing a cover gas passage through which the blowby gas flows from the main body gas passage to an outlet of the side projection portion, the cover gas passage having a minimum passage cross-sectional area portion in which a passage cross-sectional area of the cover gas passage is the smallest; setting the minimum passage cross-sectional area portion not in the side projection portion but in the main body gas passage; setting a hole for attaching a pressure detector that detects a pressure in the main body gas passage from an outside of the main body or a projection branch passage for connecting the pressure detector from the outside of the main body at a position downstream of the minimum passage cross-sectional area portion in the main body; forming the main body with a first mold and a second mold at least one of which is movable along a main body mold draft direction; forming the side projection portion with a side mold that is movable along a side mold draft direction that is an axial direction of the side projection portion and is a direction different from the main body mold draft direction; and forming the hole or the projection branch passage with one of the first mold and the second mold, or the side mold, to integrally mold the main body, the hole or the projection branch passage, and the side projection portion.

DETAILED DESCRIPTION OF THE EMBODIMENT

Figure 1:
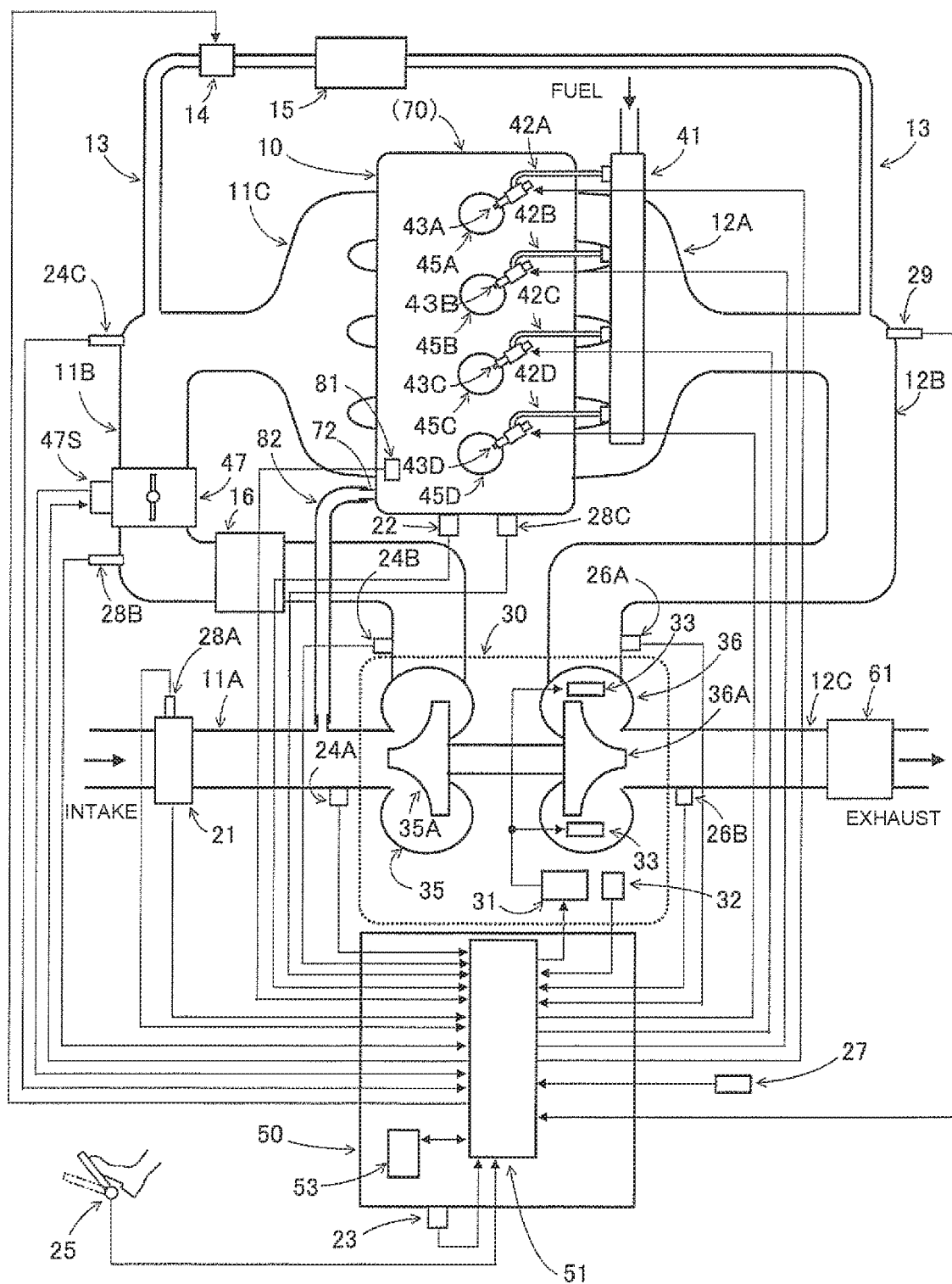
FIG. 1 is a view for describing an example of a schematic configuration of an entire system of an internal combustion engine.

Example of Schematic Configuration of Entire System of Internal Combustion Engine 10 (FIG. 1)

An exemplary embodiment of the present disclosure will be described hereinafter with reference to the drawings. First, an example of a schematic configuration of an entire system of an internal combustion engine 10 will be described using FIG. 1. The present exemplary embodiment will be described using an internal combustion engine 10 (for example, a diesel engine) mounted on a vehicle as an example of the internal combustion engine.

The entire system will be described in order from an intake side toward an exhaust side hereinafter. On an inflow side of an intake pipe 11A, an air cleaner (not shown) and an intake flow rate detector 21 (for example, an intake flow rate sensor) are provided. The intake flow rate detector 21 outputs a detection signal corresponding to a flow rate of air inhaled by the internal combustion engine 10 to a controller 50. The intake flow rate detector 21 is provided with an intake temperature detector 28A (for example, an intake temperature sensor). The intake temperature detector 28A outputs a detection signal corresponding to a temperature of intake air passing through the intake flow rate detector 21 to the controller 50.

An outflow side of the intake pipe 11A is connected to an inflow side of a compressor 35, and an outflow side of the compressor 35 is connected to an inflow side of an intake pipe 11B. A turbocharger 30 includes the compressor 35 having a compressor impeller 35A and a turbine 36 having a turbine impeller 36A. The compressor impeller 35A is rotationally driven by the turbine impeller 36A rotationally driven by an exhaust gas, and supercharges the intake air flowing in from the intake pipe 11A by pumping to the intake pipe 11B.

In the intake pipe 11A on an upstream side of the compressor 35, a compressor upstream pressure detector 24A is provided. The compressor upstream pressure detector 24A is, for example, a pressure sensor, and outputs a detection signal corresponding to a pressure in the intake pipe 11A that is on the upstream of the compressor 35 to the controller 50. In the intake pipe 11B (a position of the intake pipe 11B between the compressor 35 and an intercooler 16) downstream of the compressor 35, a compressor downstream pressure detector 24B is provided. The compressor downstream pressure detector 24B is, for example, a pressure sensor, and outputs a detection signal corresponding to a pressure in the intake pipe 11B that is downstream of the compressor 35 to the controller 50.

In the intake pipe 11B, the intercooler 16 is disposed upstream and a throttle device 47 is disposed downstream of the intercooler 16. The intercooler 16 is disposed downstream of the compressor downstream pressure detector 24B, and lowers a temperature of the intake air supercharged by the compressor 35. Between the intercooler 16 and the throttle device 47, an intake temperature detector 28B (for example, an intake temperature sensor) is provided. The intake temperature detector 28B outputs a detection signal corresponding to the temperature of the intake air that has been lowered by the intercooler 16 to the controller 50.

The throttle device 47 drives a throttle valve that adjusts an opening degree of the intake pipe 11B based on a control signal from the controller 50, so that an intake flow rate is adjusted. The controller 50 outputs a control signal to the throttle device 47 based on a detection signal from a throttle opening degree detector 47S (for example, throttle opening degree sensor) and a target throttle opening degree, so that an opening degree of the throttle valve provided in the intake pipe 11B is adjusted. The controller 50 obtains the target throttle opening degree on the basis of a depression amount of an accelerator pedal detected based on a detection signal from an accelerator pedal depression amount detector 25 and an operation state of the internal combustion engine 10.

The accelerator pedal depression amount detector 25 is, for example, an accelerator pedal depression angle sensor, and is provided on the accelerator pedal. The depression amount of the accelerator pedal by a driver is detected by the controller 50 based on the detection signal from the accelerator pedal depression amount detector 25.

A pressure detector 24C is provided downstream of the throttle device 47 in the intake pipe 11B to which an outflow side of an exhaust gas recirculation (EGR) pipe 13 is connected. An outflow side of the intake pipe 11B is connected to an inflow side of an intake manifold 11C, and an outflow side of the intake manifold 110 is connected to an inflow side of the internal combustion engine 10. The pressure detector 24C is, for example, a pressure sensor, and outputs a detection signal corresponding to a pressure of the intake air just before flowing into the intake manifold 11C to the controller 50. An EGR gas flowing from an inflow side of the EGR pipe 13 (connection portion with an exhaust pipe 12B) is discharged into the intake pipe 11B from the outflow side of the EGR pipe 13 (connection portion with the intake pipe 11B). A passage through which the EGR gas flows and that is formed with the EGR pipe 13 corresponds to an EGR passage.

The internal combustion engine 10 has a plurality of cylinders 45A to 45D, and injectors 43A to 43D are provided in the respective cylinders. Fuel is supplied to the injectors 43A to 43D via a common rail 41 and fuel pipes 42A to 42D. The injectors 43A to 43D are driven by a control signal from the controller 50, and inject the fuel into the respective cylinders 45A to 45D.

A blowby gas recirculation system for flowing the blowby gas generated in the internal combustion engine 10 from the internal combustion engine 10 to an intake passage (intake pipe 11A) includes a cylinder head cover 70 and a pipe 82. The cylinder head cover 70 is attached to a cylinder head of the internal combustion engine 10 so as to cover the cylinder head (refer to FIG. 2), and the cylinder head cover 70 is provided with a side projection portion 72 (refer to FIG. 2) for discharging the blowby gas. The side projection portion 72 of the cylinder head cover 70 and the intake pipe 11A (corresponding to the intake passage) are connected by the pipe 82 for a blowby gas recirculation. The blowby gas generated in the internal combustion engine 10 is collected in the cylinder head cover 70, and is leaded to the intake pipe 11A (corresponding to the intake passage) via the side projection portion 72 and the pipe 82. Since the intake pipe 11A is on the upstream side of the compressor 35, a negative pressure is generated during operation of the internal combustion engine 10. The blowby gas in the pipe 82 is sucked by the negative pressure, and the sucked blowby gas burns in the internal combustion engine 10. A pressure detector 81 for detecting a split, a crack, a falling off, and the like of the pipe 82 is connected to or attached to the cylinder head cover 70. The pressure detector 81 is, for example, a pressure sensor, and outputs a detection signal corresponding to a pressure in the pipe 82 to the controller 50.

The internal combustion engine 10 is provided with a rotation detector 22, a coolant temperature detector 28C, and the like. The rotation detector 22 is, for example, a rotation sensor, and outputs a detection signal corresponding to the number of rotations of a crankshaft of the internal combustion engine 10 (that is, engine speed) to the controller 50. The coolant temperature detector 28C is, for example, a temperature sensor, detects a temperature of a coolant for cooling circulated in the internal combustion engine 10, and outputs a detection signal corresponding to the detected temperature to the controller 50.

An inflow side of an exhaust manifold 12A is connected to an exhaust side of the internal combustion engine 10, and an inflow side of the exhaust pipe 12B is connected to an outflow side of the exhaust manifold 12A. An outflow side of the exhaust pipe 12B is connected to an inflow side of the turbine 36, and an outflow side of the turbine 36 is connected to an inflow side of an exhaust pipe 12C.

The inflow side of the EGR pipe 13 is connected to the exhaust pipe 12B. The EGR pipe 13 makes communication between the exhaust pipe 12B and the intake pipe 11B, and recirculates a part of the exhaust gas in the exhaust pipe 12B (corresponding to the exhaust passage) to the intake pipe 11B (corresponding to the intake passage). An EGR cooler 15 and an EGR valve 14 are provided in the EGR pipe 13.

The EGR valve 14 is provided downstream of the EGR cooler 15 in the EGR pipe 13. The EGR valve 14 adjusts a flow rate of the EGR gas flowing in the EGR pipe 13 by adjusting an opening degree of the EGR pipe 13 based on a control signal from the controller 50.

The EGR cooler 15 is provided in the EGR pipe 13. The EGR cooler 15 is a so-called heat exchanger, is supplied with the coolant for cooling, and cools and discharges the EGR gas flowed thereinto.

An exhaust temperature detector 29 is provided in the exhaust pipe 12B. The exhaust temperature detector 29 is, for example, an exhaust temperature sensor, and outputs a detection signal corresponding to the exhaust temperature to the controller 50.

An outflow side of the exhaust pipe 12B is connected to an inflow side of the turbine 36, and an outflow side of the turbine 36 is connected to an inflow side of an exhaust pipe 12C. The turbine 36 is provided with variable nozzles 33 controlling flow velocity of the exhaust gas to be leaded to the turbine impeller 36A, and an opening degree of each of the variable nozzles 33 is adjusted by a nozzle drive 31. The controller 50 outputs a control signal to the nozzle drive 31 based on a detection signal from a nozzle opening detector 32 (for example, nozzle opening sensor) and a target nozzle opening degree, so that the opening degree of each of the variable nozzles 33 is adjusted.

In the exhaust pipe 12B that is on an upstream side of the turbine 36, a turbine upstream pressure detector 26A is provided. The turbine upstream pressure detector 26A is, for example, a pressure sensor, and outputs a detection signal corresponding to a pressure in the exhaust pipe 12B that is on the upstream side of the turbine 36 to the controller 50. In the exhaust pipe 12C that is downstream of the turbine 36, a turbine downstream pressure detector 26B is provided. The turbine downstream pressure detector 26B is, for example, a pressure sensor, and outputs a detection signal corresponding to a pressure in the exhaust pipe 12C that is downstream of the turbine 36 to the controller 50.

An exhaust gas purification device 61 is connected to an outflow side of the exhaust pipe 12C. For example, when the internal combustion engine 10 is the diesel engine, the exhaust gas purification device 61 includes an oxidation catalyst, a particulate collection filter, a selective reduction catalyst, and the like.

The controller 50 includes at least a control unit 51 (central processing unit (CPU)) and a storage 53. The controller 50 (control unit 51) detects the operation state of the internal combustion engine 10 based on detection signals from various detectors including the above detectors, not limited to the detectors and actuators shown in FIG. 1, and controls various actuators including the above injectors 43A to 43D, the EGR valve 14, the nozzle drive 31, and the throttle device 47, The storage 53 is, for example, a storage device such as a flash read-only memory (ROM), and stores programs, data, and the like for executing control of the internal combustion engine, self-diagnosis, and the like.

An atmospheric pressure detector 23 is, for example, an atmospheric pressure sensor, and is provided in the controller 50. The atmospheric pressure detector 23 outputs to the controller 50 a detection signal corresponding to an atmospheric pressure around the controller 50.

A vehicle speed detector 27 is, for example, a vehicle speed detection sensor, and is provided on a wheel or the like of the vehicle. The vehicle speed detector 27 outputs a detection signal corresponding to a rotation speed of the wheel of the vehicle to the controller 50.

[External Appearance and Structure of Cylinder Head Cover 70 (FIG. 2 to FIG. 6)]

Figure 2:
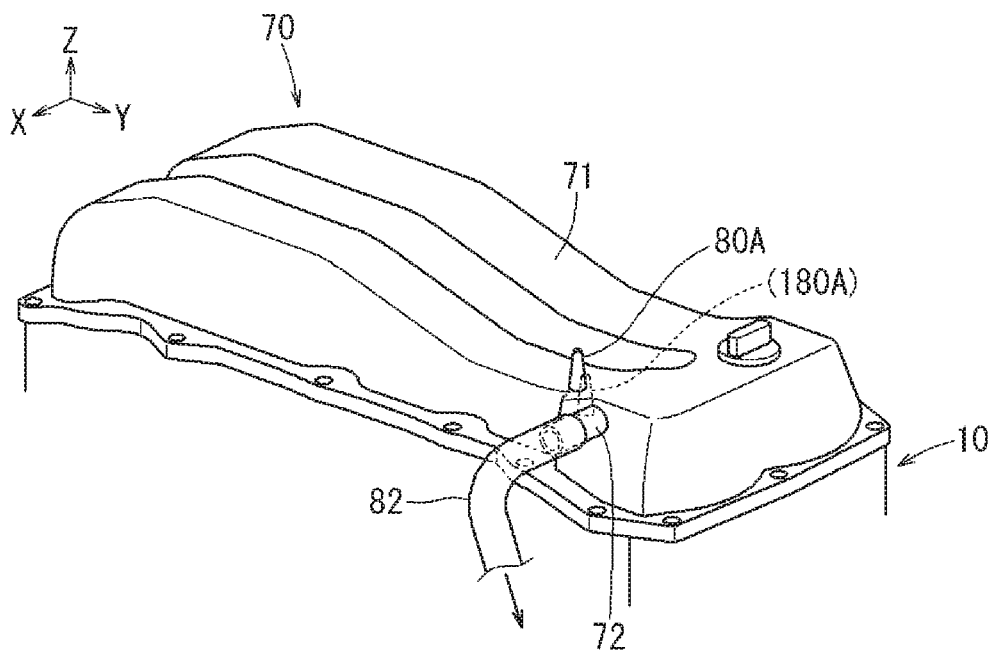
FIG. 2 is a perspective view for describing an example of an external appearance of a cylinder head cover.

An external appearance, a structure, and the like of the cylinder head cover 70 will be described hereinafter with reference to FIG. 2 to FIG. 6. As shown in FIG. 2, the cylinder head cover 70 has a main body 71 and the side projection portion 72, and the main body 71 and the side projection portion 72 are molded components formed of resin or metal. In FIG. 2 to FIG. 6, a reference numeral (180A) shown by a dotted line shows a position of the projection branch passage in the background art cylinder head cover for easy comparison, and does not show a position of a projection branch passage 80A according to the present exemplary embodiment.

Figure 4:
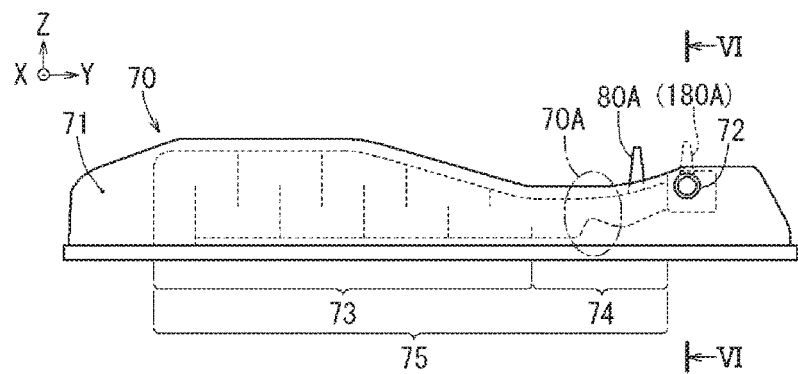
FIG. 4 is a side view of the cylinder head cover.

As shown in FIG. 2, the main body 71 is provided so as to cover the cylinder head of the internal combustion engine 10. The blowby gas generated in the internal combustion engine 10 is collected in the main body 71. As shown in FIG. 4, the main body 71 has a labyrinth passage portion 73 which has a predetermined passage cross-sectional area and is formed so that the blowby gas flows like a labyrinth, and a connection passage portion 74 that has a predetermined passage cross-sectional area and that connects an outlet of the labyrinth passage portion 73 and the side projection portion 72. The labyrinth passage portion 73 and the connection passage portion 74 form a main body gas passage 75, and the main body gas passage 75 and the side projection portion 72 form a cover gas passage. The main body gas passage 75 is accommodated in the main body 71 and leads the blowby gas collected in the main body 71 to the side projection portion 72. The connection passage portion 74 is provided with a minimum passage cross-sectional area portion 70A in which the passage cross-sectional area is the smallest in the cover gas passage. Since the labyrinth passage portion 73 is the labyrinth-like passage, an oil component and the like are separated from the blowby gas that has passed through.

Figure 3:
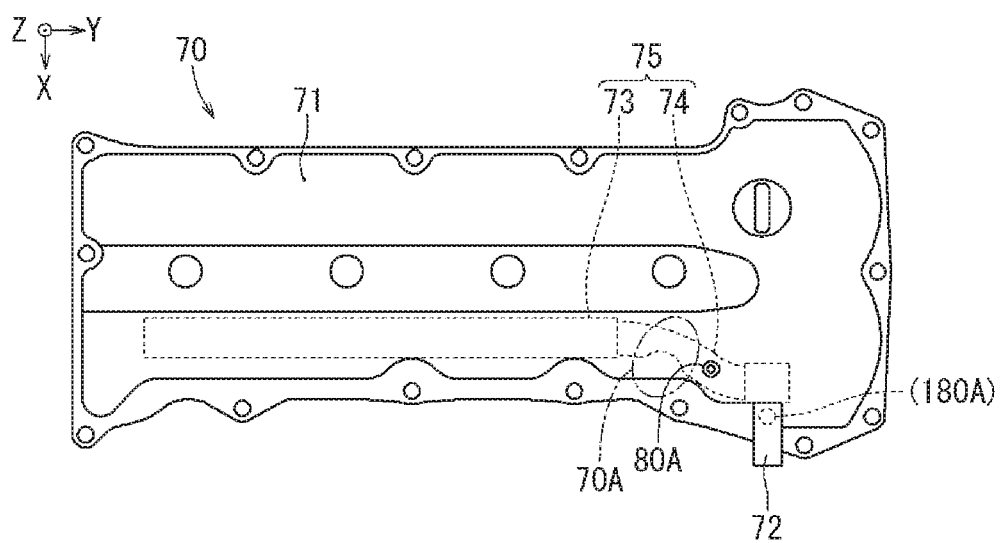
FIG. 3 is a plan view of the cylinder head cover.

As shown in FIG. 2 and FIG. 3, the side projection portion 72 is provided so as to project from a side of the main body 71 and has a tubular shape. The side projection portion 72 discharges the blowby gas collected in the main body 71 toward the intake passage (intake pipe 11A) via the pipe 82 as shown in FIG. 1. The side projection portion 72 and the intake passage (intake pipe 11A) are connected with the pipe 82 for the blowby gas recirculation (refer to FIG. 1). The side projection portion 72 is made by the forced extraction manufacturing method.

As described above, in order to detect the split, the crack, the falling off, and the like of the pipe 82 shown in FIG. 2 by the pressure, it has been considered that it is necessary to detect the pressure in the side projection portion 72 used as an inlet portion of the pipe 82. However, by various experiments and simulations, it has been found that the split, the crack, the falling off, and the like of the pipe 82 is detected when the pressure is detected downstream of a position where the passage cross-sectional area is the smallest in the flow passage through which the blowby gas flows from an inside of the main body 71 to an outlet of the side projection portion 72.

Figure 6:
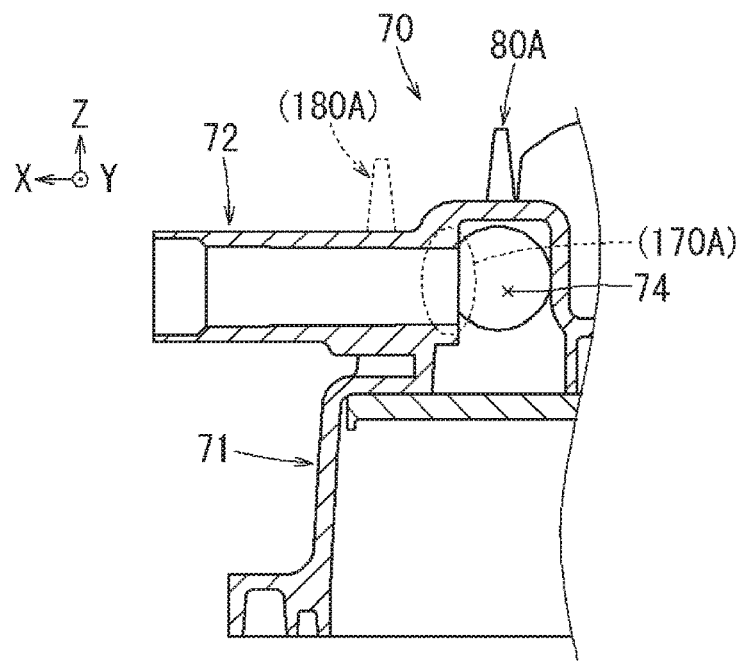
FIG. 6 is a sectional view taken along a line VI-VI in FIG. 4.

In the background art cylinder head cover, a portion denoted by a reference numeral 170A shown in FIG. 6 is the minimum passage cross-sectional area portion. The portion denoted by the reference numeral 170A is an inlet portion of the side projection portion 72, and the inlet portion has become the minimum passage cross-sectional area portion in the passage in the side projection portion 72 due to a relationship of a draft angle when molding. Thus, a hole for attaching a pressure detector or a projection branch passage for connecting a detection pipe of the pressure detector has to be provided downstream of the portion denoted by the reference numeral 170A (that is, in the side projection portion 72). In the background art cylinder head cover, there is no portion whose cross-sectional area is smaller than the portion denoted by the reference numeral 170A in the passage in the main body.

Figure 5:
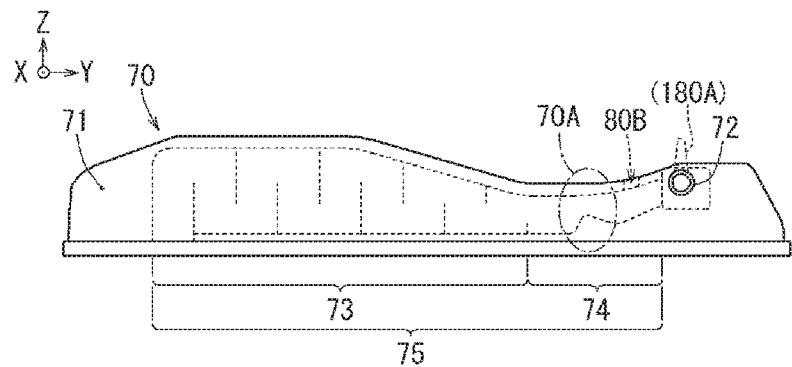
FIG. 5 is a side view of the cylinder head cover in which a projection branch passage in FIG. 4 is changed to a hole.

Therefore, in the cylinder head cover 70 described in the present exemplary embodiment, as shown in FIG. 3 to FIG. 5, the minimum passage cross-sectional area portion 70A in which the passage cross-sectional area is the smallest is provided not in the side projection portion 72 but in the main body gas passage 75 in the cover gas passage through which the blowby gas flows from the main body gas passage 75 (the labyrinth passage portion 73 and the connection passage portion 74) to the outlet of the side projection portion 72. Then, a hole 80B (refer to FIG. 5) or the projection branch passage 80A (refer to FIG. 4) communicating with the main body gas passage 75 is provided at a position of the main body gas passage 75 that is downstream of the minimum passage cross-sectional area portion 70A in the main body 71.

Furthermore, as shown in FIG. 3 and FIG. 4, the position of the minimum passage cross-sectional area portion 70A and the position of the projection branch passage 80A (or the hole 80B) are more preferably set in the connection passage portion 74 in the main body gas passage 75 (the labyrinth passage portion 73 and the connection passage portion 74). Since the connection passage portion 74 is closer to the pipe 82 than the labyrinth passage portion 73, the connection passage portion 74 has high responsiveness to pressure changes in the pipe 82.

As shown in FIG. 5, when the hole 80B is provided, the pressure detector 81 (refer to FIG. 1) is inserted into and attached to the hole 80B from an outside of the main body 71. In a case in which the hole 80B is formed in the main body 71, when the cylinder head cover 70 is attached to the internal combustion engine, the hole 80B is formed to be disposed on a side opposite to the cylinder head and to be opened to the side opposite to the cylinder head. Thus, as described later, since a main body mold draft direction DZ (refer to FIG. 7) at a time of integral molding and an opening direction of the hole 80B are made to coincide with each other, the main body 71 and the hole 80B are easily integrally molded.

As shown in FIG. 4, when the projection branch passage 80A is provided, the detection pipe of the pressure detector 81 is connected to the projection branch passage 80A from the outside of the main body 71. In a case in which the projection branch passage 80A is formed in the main body 71, when the cylinder head cover 70 is attached to the internal combustion engine, the projection branch passage 80A is formed on the side opposite to the cylinder head to project to the side opposite to the cylinder head. Thus, as described later, since the main body mold draft direction DZ (refer to FIG. 7) at the time of integral molding and a projection direction of the projection branch passage 80A are made to coincide with each other, the main body 71 and the projection branch passage 80A are easily integrally molded.

When the cylinder head cover is attached to the internal combustion engine, a height of the cylinder head cover in the direction from a side of the cylinder head toward the side opposite to the cylinder head (Z-axis direction in the example of FIG. 4 and FIG. 5) is referred to as a cylinder head cover height. In this case, the minimum passage cross-sectional area portion 70A is provided at a portion of the cylinder head cover where the cylinder head cover height is lower than the surrounding cylinder head cover height. When the projection branch passage 80A is provided on a downstream side in the vicinity of the minimum passage cross-sectional area portion 70A, the cylinder head cover height is suppressed from increasing higher than necessary. When the hole 80B is provided on the downstream side in the vicinity of the minimum passage cross-sectional area portion 70A, the cylinder head cover height including a projection height of the pressure detector attached to the hole 80B is suppressed from increasing higher than necessary. Therefore, mountability of the cylinder head cover on the vehicle is further improved (space saving). In the description of the present exemplary embodiment, an example in which not the hole 80B but the projection branch passage 80A is provided will be described hereinafter.

[Method of Manufacturing Cylinder Head Cover 70 (FIG. 7, FIG. 8)]

A method of manufacturing the cylinder head cover 70 will be described hereinafter with reference to FIG. 7, FIG. 8. The main body 71 of the cylinder head cover 70, the projection branch passage 80A (or the hole 80B), and the side projection portion 72 are resin or metal molded components and are integrally molded.

Figure 7:
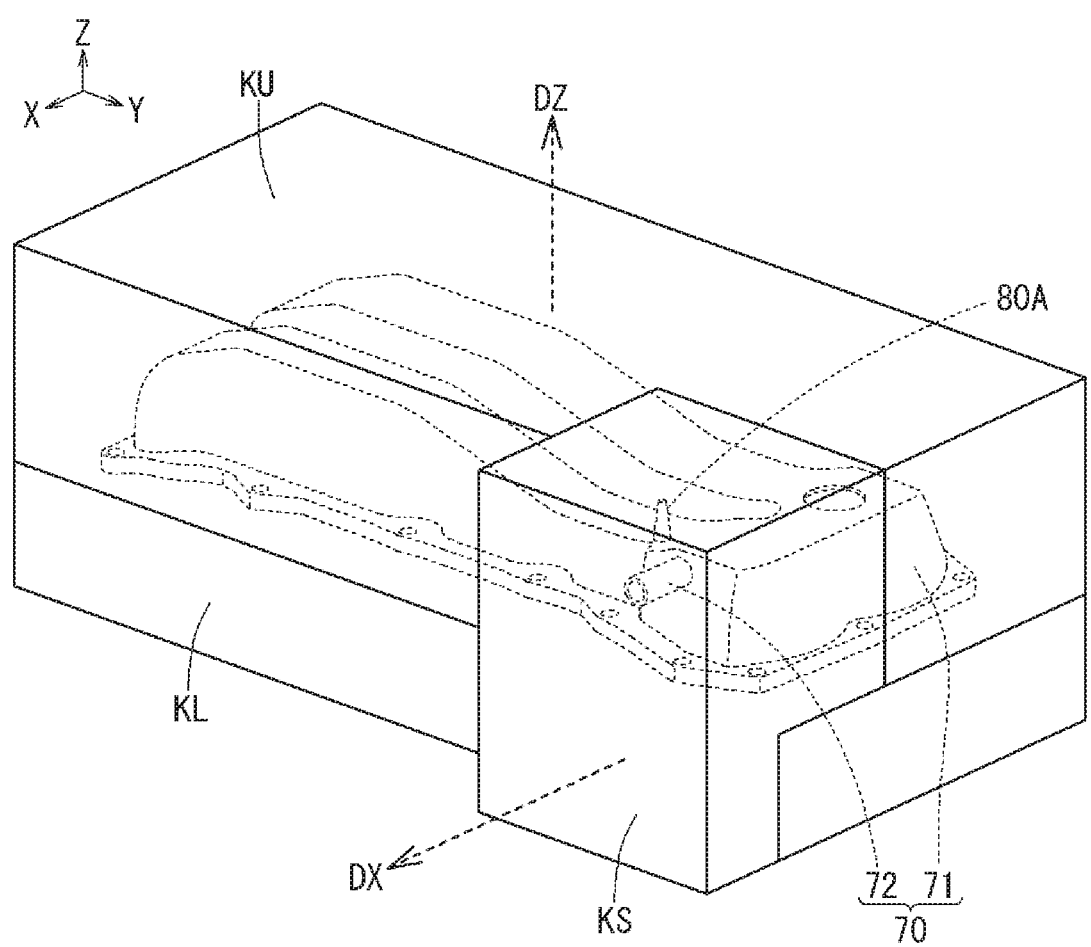
FIG. 7 is a perspective view for describing draft directions and the like of a first mold, a second mold, and a side mold when the cylinder head cover is integrally molded.
Figure 8:
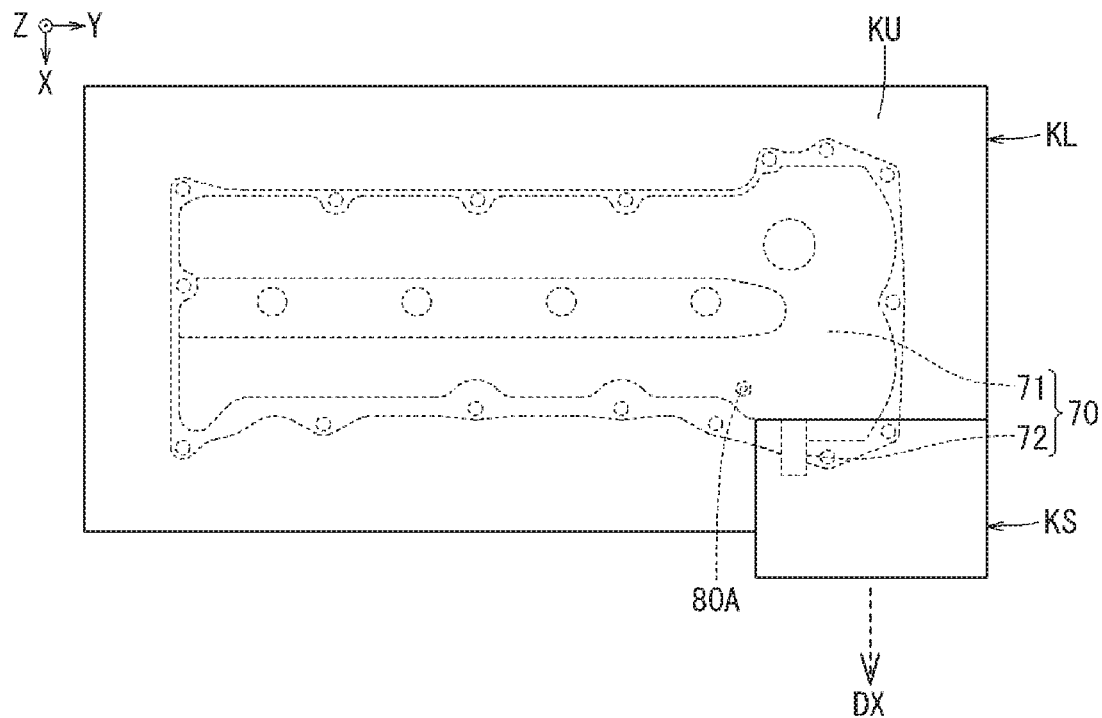
FIG. 8 is a plan view of FIG. 7.
Figure 9:
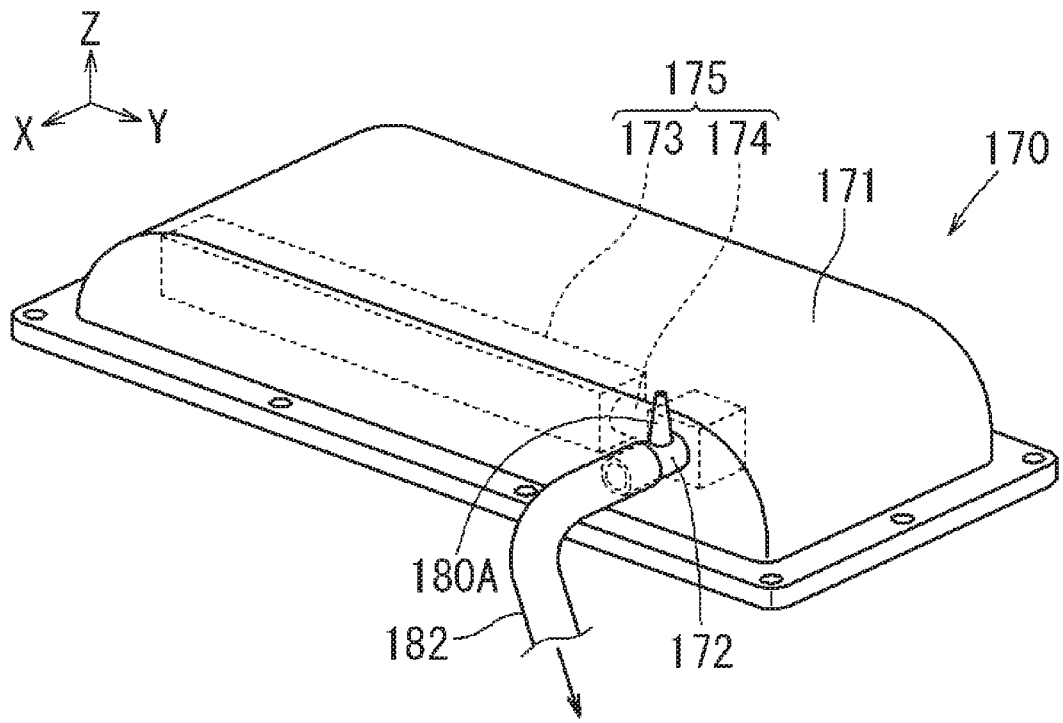
FIG. 9 is a perspective view for describing an example of an external appearance of a background art cylinder head cover.
Figure 10:
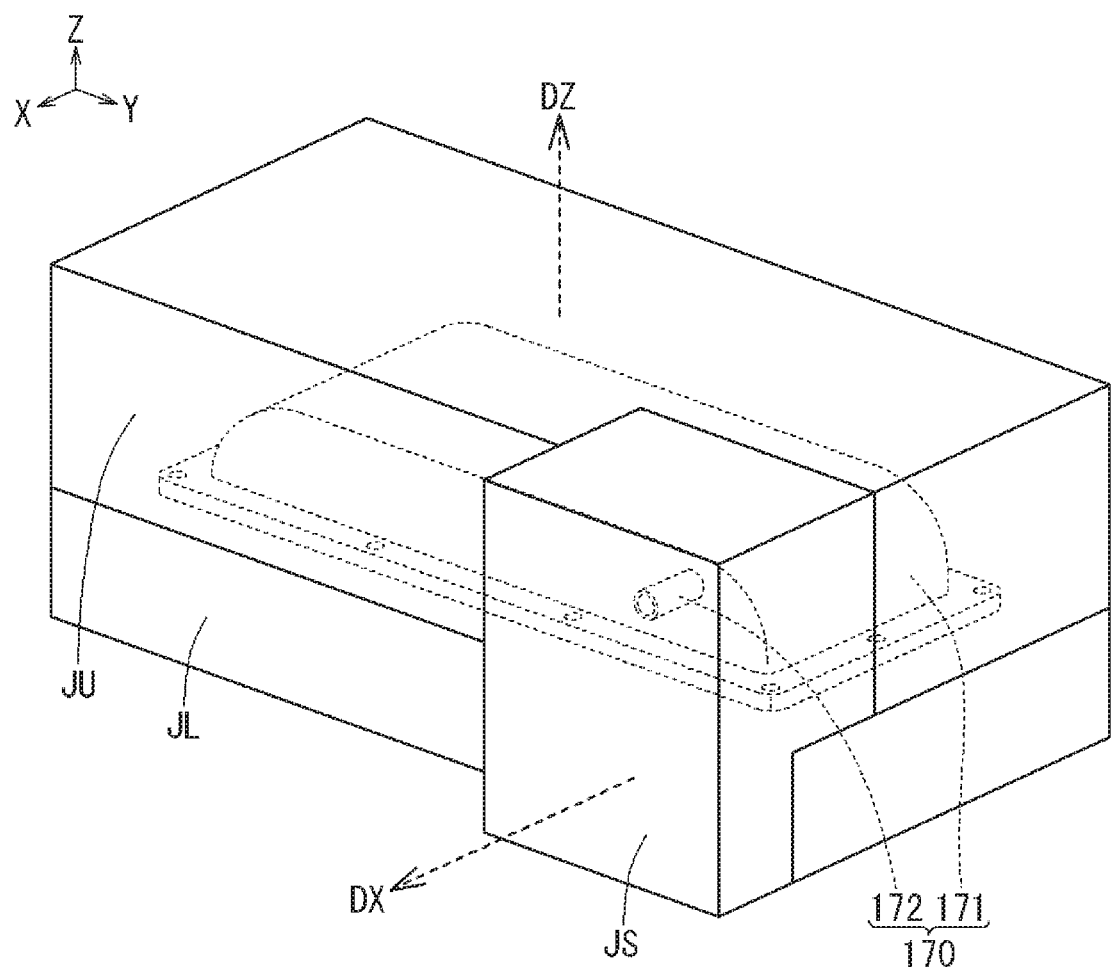
FIG. 10 is a perspective view for describing draft directions and the like of a first mold, a second mold, and a side mold when the background art cylinder head cover is integrally molded.
Figure 11:
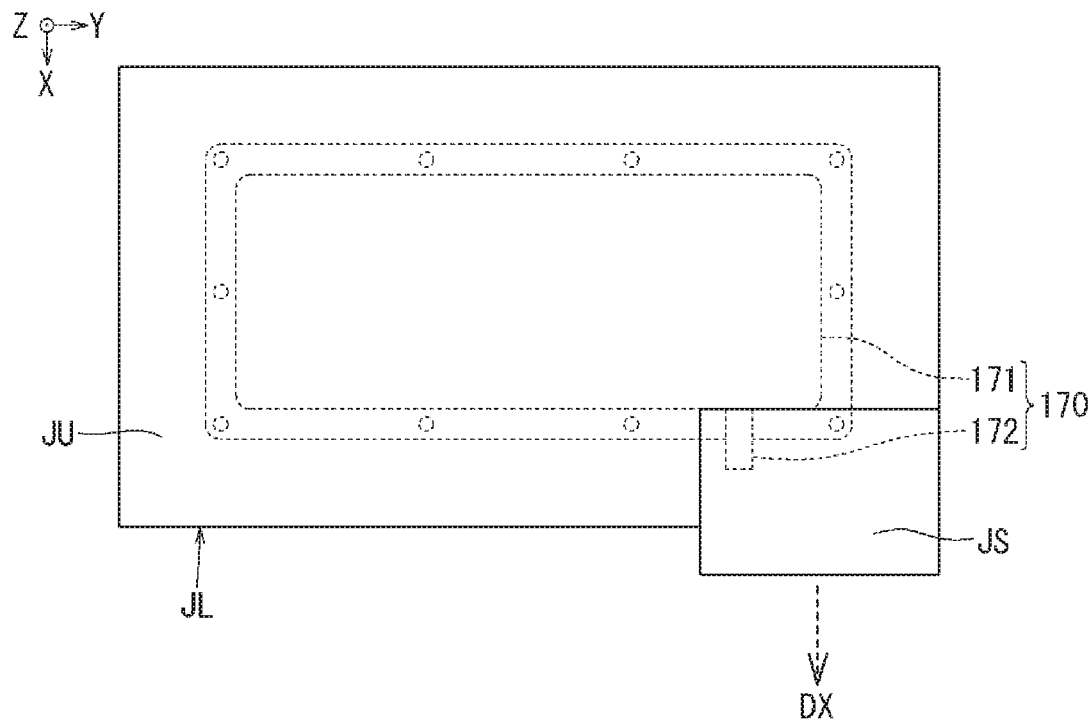
FIG. 11 is a plan view of FIG. 10.
Figure 12:
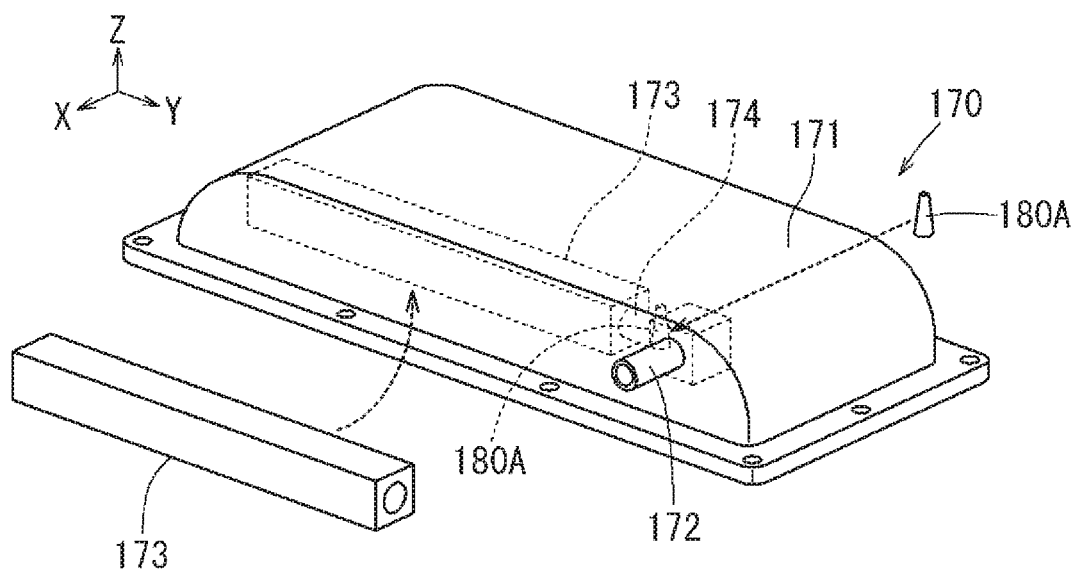
FIG. 12 is a view for describing an example in which a projection branch passage and a labyrinth passage portion are attached to the integrally molded background art cylinder head cover (the cylinder head cover in which the projection branch passage and the labyrinth passage portion are separated).

As shown in FIG. 7 and FIG. 8, the main body 71 and the projection branch passage 80A are formed with at least one of a first mold KU (metal mold or the like) and a second mold KL (metal mold or the like) at least one of which is movable along the main body mold draft direction DZ (refer to FIG. 7, Z-axis direction in this case). The projection branch passage 80A (or the hole 80B) is formed with the first mold KU or the second mold KL, and is formed so that the projection direction (or opening direction) is along the main body mold draft direction DZ. For example, in a case where the main body mold draft direction DZ is set in an upper direction and the first mold KU is disposed above the second mold KL, the projection branch passage 80A (or the hole 80B) is formed with the first mold KU. Thus, the main body 71 and the projection branch passage 80A (or the hole 80B) are easily integrally molded, and the main body 71 and the projection branch passage 80A (or the hole 80B) are molded at the same time with the first mold KU and the second mold KL that are the mold for manufacturing the main body 71. Therefore, the number of parts and the manufacturing process are reduced.

As shown in FIG. 7 and FIG. 8, the side projection portion 72 is formed by the forced extraction manufacturing method with the side mold KS (metal mold or the like) movable along a side mold draft direction DX (refer to FIG. 7, FIG. 8, X-axis direction in this case) that is an axial direction of the cylindrical side projection portion 72 and that is the direction different from the main body mold draft direction DZ. The side projection portion 72 is integrally formed with the main body 71. Thus, the main body 71, the projection branch passage 80A (or the hole 80B), and the side projection portion 72 are integrally molded. As a result, there is no necessity of welding or the like (or punching of the hole in the case of the hole) of the projection branch passage 80A (or the hole 80B) in a post-process after the main body 71 and the side projection portion 72 are integrally molded, so that the number of parts and the manufacturing process are reduced.

The cylinder head cover 70 and the method of manufacturing the cylinder head cover 70 according to the present disclosure are not limited to the configuration, structure, manufacturing method, and the like described in the present exemplary embodiment, and various changes, additions, and deletions are made without departing from the spirit and the scope of the present disclosure. For example, the turbocharger 30 may be omitted.

The cylinder head cover and the method of manufacturing the cylinder head cover according to the present disclosure are not limited to the diesel engine, and are applied to various internal combustion engines such as a gasoline engine.

In the description of the present exemplary embodiment, although the example in which the hole 80B is opened on the side opposite to the cylinder head has been described (refer to FIG. 5), the opening direction of the hole 80B may become the same direction as the side projection portion 72 extends. Similarly, in the description of the present exemplary embodiment, although the example in which the projection branch passage 80A is disposed on the side opposite to the cylinder head has been described (refer to FIG. 4), the projection direction of the projection branch passage 80A may become the same direction as the side projection portion 72 extends.

In the description of the present exemplary embodiment, although the example in which the minimum passage cross-sectional area portion 70A and the projection branch passage 80A (or the hole 80B) are provided in the connection passage portion 74 has been described (refer to FIG. 4 and FIG. 5), the minimum passage cross-sectional area portion 70A and the projection branch passage 80A (or the hole 80B) may be provided in the labyrinth passage portion 73.

In the description of the present exemplary embodiment, although the example in which the minimum passage cross-sectional area portion is provided at the portion of the cylinder head cover where the cylinder head cover height is lower than the surrounding cylinder head cover height has been described (refer to FIG. 4, FIG. 5), the minimum passage cross-sectional area portion may be provided at a portion of the cylinder head cover whose height is equal to or higher than the surrounding cylinder head cover height.

In the description of the present exemplary embodiment, although the example in which the main body mold draft direction DZ is set in the upper direction and the first mold KU is disposed above the second mold KL has been described, the main body mold draft direction DZ may be set in a substantially horizontal direction and the first mold KU may be disposed on the side of the second mold KL.

Advantageous Effects of Disclosure

One end of a blowby gas recirculation pipe that leads a blowby gas in a cylinder head cover to an intake passage is connected to a side projection portion of the cylinder head cover, and the other end is connected to the intake passage. In order to detect a split, a crack, a falling off, and the like of the pipe by a pressure, it has been considered that it is necessary to detect the pressure in the side projection portion used as an inlet portion of the pipe. However, by various experiments and simulations, it has been found that the split, the crack, the falling off, and the like of the pipe are detected when the pressure is detected downstream of a position where a passage cross-sectional area is the smallest in a flow passage of the blowby gas from an inside of a main body of the cylinder head cover to an outlet of the side projection portion.

In a first aspect of the disclosure, a minimum passage cross-sectional area portion is provided not in the side projection portion but in a main body gas passage. Thus, a hole for attaching a pressure detector that appropriately detects a split, a crack, a falling off, and the like of the blowby gas recirculation pipe or a projection branch passage for connecting the pressure detector is provided in the main body gas passage that is downstream of the minimum passage cross-sectional area portion in the main body. The number of parts and manufacturing process are reduced by simultaneously molding the main body and the projection branch passage (or the hole) with a mold for forming the main body, or by simultaneously molding the side projection portion and the projection branch passage (or the hole) with a mold for forming the side projection portion.

In a second aspect of the disclosure, by setting an arrangement position and an opening direction of the hole to an appropriate position and an appropriate direction respectively, or by setting an arrangement position and a projection direction of the projection branch passage to an appropriate position and an appropriate direction respectively, the main body and the hole or the projection branch passage become configurations to be more easily integrally molded.

In a third aspect of the disclosure, the minimum passage cross-sectional area portion and the hole or the projection branch passage are set at a position closer to the blowby gas recirculation pipe in a blowby gas passage (in a passage in the cylinder head cover) excluding the side projection portion. Thus, the pressure for detecting the split, the crack, the falling off, and the like of the blowby gas recirculation pipe is more accurately and responsively detected.

According to a fourth aspect of the disclosure, when the projection branch passage is provided on a downstream side in the vicinity of the minimum passage cross-sectional area portion, a cylinder head cover height is suppressed from increasing higher than necessary. In addition, when the hole is provided on the downstream side in the vicinity of the minimum passage cross-sectional area portion, the cylinder head cover height including a projection height of the pressure detector attached to the hole is suppressed from increasing higher than necessary. Therefore, mountability of the cylinder head cover on the vehicle is further improved (space saving).

In a fifth aspect of the disclosure, the minimum passage cross-sectional area portion is provided not in the side projection portion but in the main body gas passage. Thus, a hole for attaching a pressure detector that appropriately detects a split, a crack, a falling off, and the like of the blowby gas recirculation pipe or a projection branch passage for connecting the pressure detector is provided in the main body gas passage that is downstream of the minimum passage cross-sectional area portion in the main body. Then, the main body, the hole or the projection branch passage, and the side projection portion are appropriately integrally molded by a first mold, a second mold and a side mold. Therefore, the number of parts and manufacturing process are reduced.

According to a seventh aspect of the disclosure, the main body, and the hole or the projection branch passage are integrally molded appropriately and easily.

What is claimed is:

1. A cylinder head cover in a blowby gas recirculation system that flows a blowby gas generated in an internal combustion engine from the internal combustion engine into an intake passage, the cylinder head cover comprising:
    a main body that is a resin or metal molded component, that is provided so as to cover a cylinder head of the internal combustion engine, and that collects the blowby gas; and
    a side projection portion that is provided so as to project from a side of the main body and that discharges the blowby gas toward the intake passage,
    wherein
    the side projection portion and the intake passage are connected with a pipe,
    the main body includes a main body gas passage that leads the collected blowby gas to the side projection portion, the main body gas passage having a predetermined passage cross-sectional area,
    the cylinder head cover includes a cover gas passage through which the blowby gas flows from the main body gas passage to an outlet of the side projection portion, the cover gas passage having a minimum passage cross-sectional area portion in which a passage cross-sectional area of the cover gas passage is the smallest, the passage cross-sectional area minimum portion being provided not in the side projection portion but in the main body gas passage,
    the main body has a hole for attaching a pressure detector that detects a pressure in the main body gas passage from an outside of the main body or a projection branch passage for connecting the pressure detector from the outside of the main body at a position downstream of the minimum passage cross-sectional area portion, and
    the main body, the side projection portion, and the hole or the projection branch passage are integrally molded.

2. The cylinder head cover according to claim 1, wherein
    in a case where the main body has the hole, when the cylinder head cover is attached to the internal combustion engine, the hole is formed on a side opposite to the cylinder head and is opened to the side opposite to the cylinder head, and
    in a case where the main body has the projection branch passage, when the cylinder head cover is attached to the internal combustion engine, the projection branch passage is formed on the side opposite to the cylinder head to project to the side opposite to the cylinder head.

3. The cylinder head cover according to claim 1, wherein
    the main body gas passage includes a labyrinth passage portion which is formed like a labyrinth, and a connection passage portion that connects an outlet of the labyrinth passage portion and the side projection portion, and
    the minimum passage cross-sectional area portion, and the hole or the projection branch passage are provided in the connection passage portion.

4. The cylinder head cover according to claim 1, wherein
    in a case a height of the cylinder head cover in a direction from a side of the cylinder head to a side opposite to the cylinder head is referred to as a cylinder head cover height when the cylinder head cover is attached to the internal combustion engine,
    the minimum passage cross-sectional area portion is provided at a portion of the cylinder head cover where the cylinder head cover height is lower than a surrounding cylinder head cover height.

5. A method of manufacturing a cylinder head cover in a blowby gas recirculation system that flows a blowby gas generated in an internal combustion engine from the internal combustion engine into an intake passage,
    the method comprising:
    providing a main body that is a resin or metal molded component, that covers a cylinder head of the internal combustion engine, and that collects the blowby gas;
    providing a side projection portion that projects from a side of the main body and that discharges the blowby gas toward the intake passage;
    setting a main body gas passage that leads the collected blowby gas to the side projection portion in the main body, the main body gas passage having a predetermined passage cross-sectional area;
    providing a cover gas passage through which the blowby gas flows from the main body gas passage to an outlet of the side projection portion, the cover gas passage having a minimum passage cross-sectional area portion in which a passage cross-sectional area of the cover gas passage is the smallest;
    setting the minimum passage cross-sectional area portion not in the side projection portion but in the main body gas passage;
    setting a hole for attaching a pressure detector that detects a pressure in the main body gas passage from an outside of the main body or a projection branch passage for connecting the pressure detector from the outside of the main body at a position downstream of the minimum passage cross-sectional area portion in the main body;
    forming the main body with a first mold and a second mold at least one of which is movable along a main body mold draft direction;
    forming the side projection portion with a side mold that is movable along a side mold draft direction that is an axial direction of the side projection portion and is a direction different from the main body mold draft direction; and forming the hole or the projection branch passage with one of the first mold and the second mold, or the side mold, to integrally mold the main body, the hole or the projection branch passage, and the side projection portion.

6. The method of manufacturing the cylinder head cover according to claim 5, comprising:

forming the hole or the projection branch passage with one of the first mold and the second mold.

7. The method of manufacturing the cylinder head cover according to claim 5, comprising:

setting the main body mold draft direction in an upper direction;

disposing the first mold above the second mold; and forming the hole or the projection branch passage with the first mold.

* * * * *